United States Patent [19]

Krakow

[11] 4,264,260
[45] Apr. 28, 1981

[54] SPARE WHEEL CARRIER FOR PICKUP TRUCKS

[76] Inventor: Frank Krakow, 4205 St. Joseph Rd., New Albany, Ind. 47150

[21] Appl. No.: 104,612

[22] Filed: Dec. 17, 1979

[51] Int. Cl.³ .............................................. B62D 43/04
[52] U.S. Cl. ................................ 414/465; 224/42.21; 224/42.23; 414/548
[58] Field of Search .............. 224/42.21, 42.22, 42.23, 224/42.26, 42.3; 414/463–466, 548, 720

[56] References Cited

U.S. PATENT DOCUMENTS

| | | | |
|---|---|---|---|
| 1,564,776 | 12/1925 | Green | 224/42.23 X |
| 1,600,629 | 9/1926 | Green | 224/42.23 |
| 1,664,856 | 4/1928 | Green | 224/42.23 |
| 2,563,810 | 8/1951 | Ballard | 414/463 |
| 3,187,914 | 6/1965 | Peras | 224/42.21 X |
| 3,210,117 | 10/1965 | Hall | 296/37.2 |
| 3,460,695 | 8/1969 | Steele | 224/42.21 X |
| 3,648,867 | 3/1972 | Beavers | 414/465 X |
| 3,698,609 | 10/1972 | Lund | 224/42.23 X |
| 3,785,518 | 1/1974 | Johnson | 414/466 |
| 3,904,093 | 9/1975 | Hanela | 224/42.21 |
| 4,047,629 | 9/1977 | Klein | 224/42.21 X |
| 4,087,032 | 5/1978 | Miller et al. | 224/42.23 |

FOREIGN PATENT DOCUMENTS 2757657  6/1979  Fed. Rep. of Germany ........ 224/42.23

*Primary Examiner*—Stephen Marcus
*Attorney, Agent, or Firm*—Norman B. Rainer

[57] ABSTRACT

A spare-wheel carrier is provided for mounting to the underside of a pickup truck adjacent the rear end thereof. The carrier is comprised of an elongated support beam which mounts to the frame of the vehicle in a manner to be disposed parallel to the wheel axles of the vehicle. A cradle frame is suspended from said support beam in a manner such that it can be pivoted downwardly and rotated rearwardly of the vehicle to facilitate easy access. A coil spring counteracts the downward force of the cradle frame. A locking mechanism ensures against unauthorized removal of a tire stored within said cradle frame.

5 Claims, 2 Drawing Figures

SPARE WHEEL CARRIER FOR PICKUP TRUCKS

BACKGROUND OF THE INVENTION

This invention relates in general to an improved spare tire carrier for use with pickup trucks and other vehicles wherein it is desirable to store a spare tire beneath the vehicle, and more particularly relates to a carrier of said nature adapted to store a tire in horizontal disposition.

The desirability of utilizing a spare tire carrier on the underside of a truck has long been known and specific embodiments have been disclosed for example in U.S. Pat. Nos. 3,187,914; 3,904,093; 4,087,032; 3,698,609; 3,210,117; 2,188,548; 1,600,629; 1,664,856 and 1,564,776. However, in the actual design and use of such systems, problems are encountered with respect to the ease with which the tire can be inserted into and removed from said carriers. A further particular difficulty in constructing a completely satisfactory carrier of the aforesaid nature is that the carrier and manipulations involving its utilization must avoid interference with other usual components of the underside of the vehicle. Although facile removal of the tire from the carrier is a generally sought advantage, effective locking means are required to prevent unauthorized removal of said tire.

It is accordingly an object of this invention to provide a spare tire carrier adapted to store a tire in horizontal disposition beneath a vehicle, said carrier being designed for facile insertion and removal of said tire.

It is another object of this invention to provide a spare tire carrier of the aforesaid nature constructed and operated in a manner so as to avoid interfering contact with other components of the underside of said vehicle, yet being of inexpensive construction.

It is a still further object of the present invention to provide a spare tire carrier of the aforesaid nature having simple yet effective means for locking said tire in place in said carrier.

These objects and other objects and advantages of the invention will be apparent from the following description.

SUMMARY OF THE INVENTION

The above and other beneficial objects and advantages are accomplished in accordance with the present invention by the provision of an improved spare tire carrier comprising an elongated support beam adapted for attachment to the underside of a vehicle, a vertical extension member fixedly attached to said support beam adjacent one extremity thereof and extending downward therefrom, a cradle frame attached to the lowermost extremity of said extension member in a manner permitting pivotal movement of said cradle frame in a horizontal plane and hinged movement in a vertical plane, a coil spring interconnecting said support beam with said cradle frame at a site adjacent said extension member, securing means associated with the extremity of said support beam opposite the extremity to which said extension member is attached, said securing means comprising means for preventing horizontal and vertical movement of said cradle frame when in a locked state, and safeguarding means for preventing unauthorized unlocking of said securing means, and a brace member pivotably connected to said cradle frame and adapted to be displaced to an upright position whereby it can engage the underside of said vehicle to counteract the restoring force of said spring when said cradle frame is in a downward position, thereby maintaining said cradle frame in a downward position.

The spare tire carrier is adapted to be mounted to the underside of a vehicle in a manner such that the disposition of said support beam parallels the wheel axles of said vehicle, thereby permitting said cradle frame to be swung downwardly and rearwardly with respect to said vehicle for the insertion or removal of a tire.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DETAILED DESCRIPTION OF THE INVENTION

Figure 1:
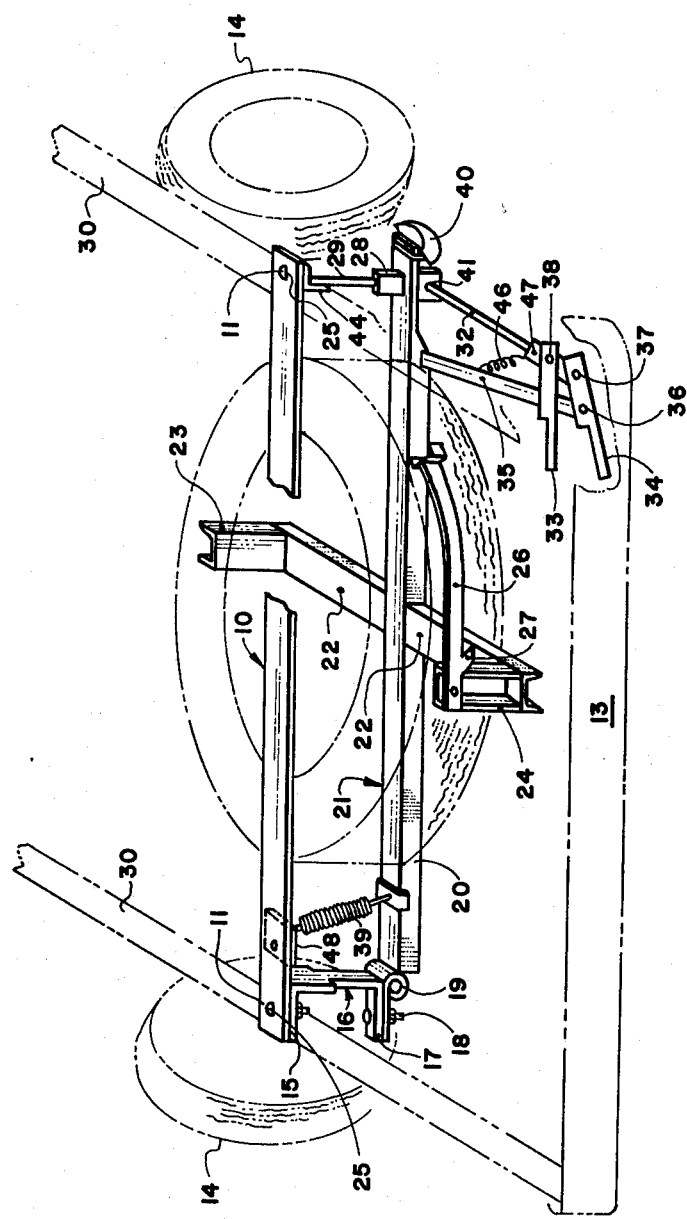
FIG. 1 is a perspective view of an embodiment of a spare tire carrier of this invention shown positioned beneath the rear of a pickup truck, and in a locked condition confining a tire.
Figure 2:
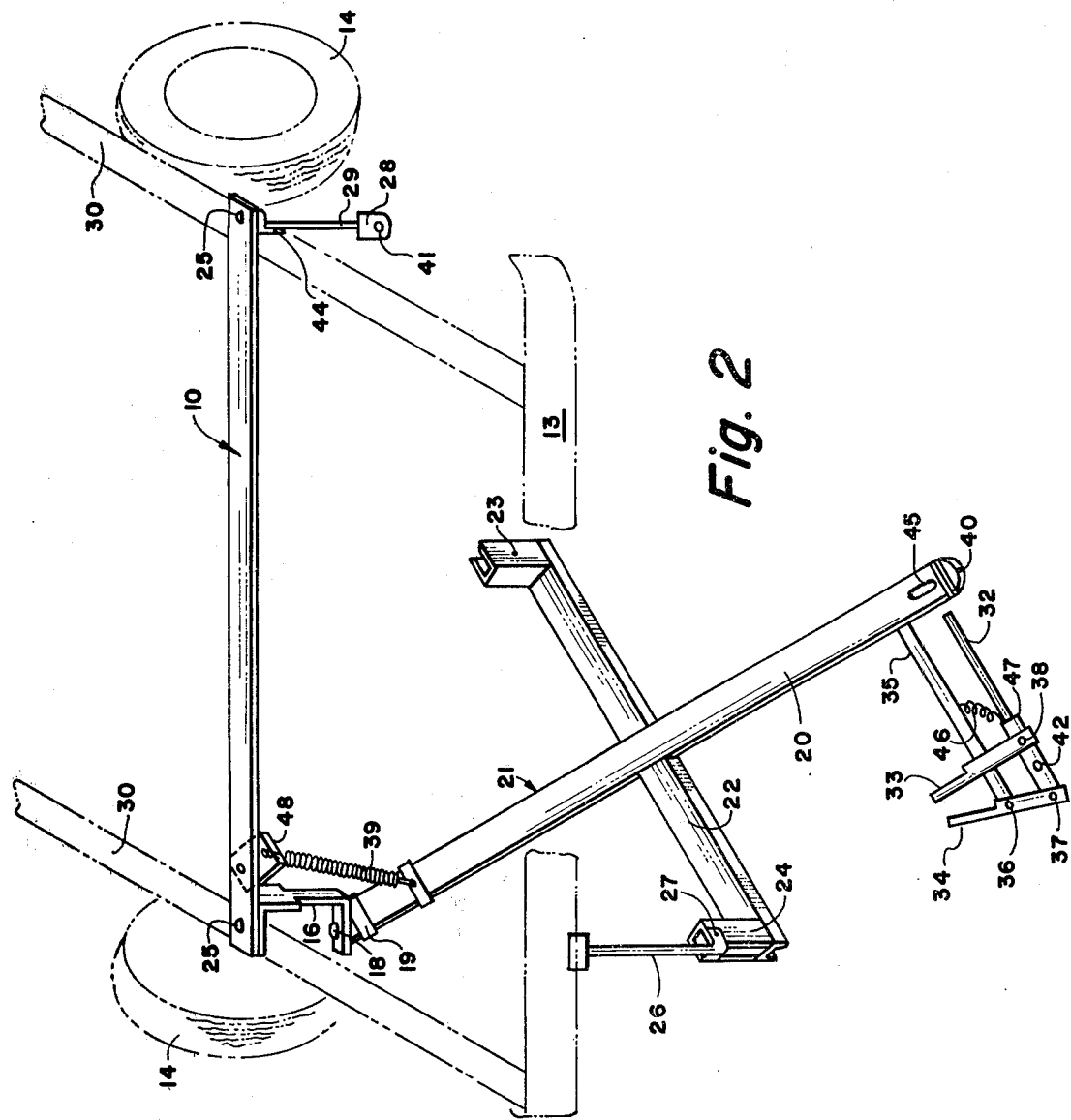
FIG. 2 is a perspective view of the embodiment of FIG. 1 showing the cradle frame in a downward and rearward position and with the tire removed therefrom.

Referring to FIGS. 1 and 2, an elongated support beam 10 is shown fabricated of flat steel stock and provided with holes 25 at each extremity to accommodate mounting bolts 11 which engage structural members 30 of the underside of a vehicle. Said support beam is adapted to be mounted in a disposition parallel to the wheel axles of said vehicle at a site generally adjacent the rear end of the vehicle, as indicated by the close proximity of rear bumper 13 and rear wheels 14. Vertical extension member 16, having the form of a U-shaped bracket, is fixedly attached at its upper end 15 to the underside of support beam 10 adjacent an extremity thereof. The lower end 17 of said extension member is rotatably attached by pivot bolt 18 to hinge 19 affixed to an extremity of longitudinal beam 20 of cradle frame 21.

Cradle frame 21 is further comprised of lateral support means represented by cross bars 22 attached to said longitudinal beam, front retaining means 23 and rear retaining means 24, said front and rear retaining means being integral with or attached to the outer extremities of lateral support means 22.

Brace member 26 is pivotably attached to rear retaining means 24 in a manner permitting movement of said brace member in a substantially vertical plane. A positioning tab 27 is associated with brace member 26 adjacent its site of pivotal attachment to rear retaining means 24, the function of said tab being to abut with rear retaining means 24 and thereby constrain said brace member to be horizontally disposed in its lowest point of pivotal movement.

A vertical post 29 is affixed to the lower surface of support beam 10 by welded attachment to angle bar 44. An anchor plate 28 containing hole 41, as shown in FIG. 2, is joined, as by welding, to the lowermost extremity of post 29 and adapted to fit within slot 45 in longitudinal beam 20.

When anchor plate 28 is brought into insertive engagement with slot 45, the hole 41 is adapted to be located below longitudinal beam 20. In said disposition, locking rod 32 can be inserted into hole 41, thereby preventing vertical and horizontal motion of cradle frame 21 with respect to support beam 10. Activation of locking rod 32 is achieved by means of pivoted handles 33 and 34 positioned at the rear extremity of horizontal extension rod 35 attached to longitudinal beam 20.

Handle 34 is joined by stationary pivot means 36 to the rearward extremity of extension rod 35 at a site substantially midlength of handle 34. Handle 34 is further connected by displaceable pivot means 37 to the rearward extremity of the base plate extension 47 of locking rod 32 in a manner such that rearward motion of handle 34 causes forward motion of locking rod 32. Handle 33 is affixed to horizontal extension rod 35 at a position forward of handle 34. The right hand extremity of handle 33 has a hole 38 capable of aligning with a hole 42, shown in FIG. 2, in the base plate extension 47 when said locking rod is in its forward position and inserted through hole 41 of anchor plate 28. When holes 38 and 42 are aligned, a padlock or similar locking device may be inserted through hole 38 and the underlying hole 42 in base plate extension 47, thereby preventing movement of rod 32. As shown in FIG. 1, locking rod 32 is in its forward position, thereby engaging hole 41 and preventing movement of cradle frame 21. As shown in FIG. 2, locking rod 32 is in its rearward position, permitting movement of said cradle frame. A spring 46 joining horizontal extension rod 35 to base plate extension 47 may be utilized to facilitate manipulation of the handles 33 and 34.

When cradle frame 21 is disengaged from support beam 10 by rearward movement of locking rod 32, said cradle frame will fall downwards about hinge 19. To minimize the downward force exerted by the weight of the cradle frame and tire held therein, a coil spring 39 is provided, which extends between pivot plate 48 supported by beam 10, and longitudinal beam 20 adjacent extension member 16. When in the released condition, the cradle frame can also be rotated rearward about pivot bolt 18 to the position shown in FIG. 2, in which condition pivot plate 48 swings rearwardly to to minimize diagonal distortion of the spring. Handles 33 and 34 may be used to guide said downward and rotative movements.

In the downward and rearward disposition, as shown in FIG. 2, brace 26 is swung into upward engagement with bumper 13, thereby serving to prevent spring 39 from prematurely lifting the cradle frame, especially when the tire is removed therefrom. A skid guard 40 mounted to the extremity of longitudinal beam 20 facilitates placement of the extremity of the cradle frame on the ground to simplify insertion or removal of a tire.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A spare-wheel carrier adapted to be mounted to the underside of a vehicle comprising (a) an elongated straight beam adapted for attachment to the underside of a vehicle in a horizontal orientation parallel to the axles of the wheels of said vehicle, (b) a vertical extension member, the upper extremity of which is affixed to the underside of said straight beam adjacent one extremity thereof.

(c) a cradle frame suspended from the lowermost extremity of said vertical extension member in a manner permitting pivotal movement in a horizontal plane and hinged movement in a vertical plane, said cradle frame being adapted to support a tire in horizontal disposition, (d) a restoring spring connecting said cradle frame to said straight beam adjacent said vertical extension member, (e) securing means associated with the extremity of said straight beam opposite the extremity having said vertical extension member, said securing means being adapted to prevent motion of the cradle frame, (f) safeguarding means associated with said securing means adapted to prevent unauthorized release of said securing means and attendant movement of said cradle frame, and (g) a brace member pivotably connected to said cradle frame and adapted to engage a portion of said vehicle, thereby holding said cradle frame in a downward position in opposition to the force of said restoring spring.

2. The spare-wheel carrier of claim 1 wherein said cradle frame comprises a longitudinal beam, lateral support means perpendicularly disposed to said longitudinal beam, and upwardly disposed retaining means associated with each extremity of said lateral support means.

3. The spare-wheel carrier of claim 2 wherein said securing means comprises an anchor plate containing a hole, said anchor plate being pendantly affixed to said straight beam adjacent the extremity thereof opposite said vertical extension member, and adapted to fit within a mating slot in said longitudinal beam such that said hole is disposed below said longitudinal beam, and a moveable locking rod associated with said cradle frame and adapted to penetrate said hole, thereby preventing vertical and horizontal movement of said cradle frame.

4. The spare-wheel carrier of claim 3 wherein said safeguarding means comprises a pair of handles, one of which is stationary and the second pivotably controlling motion of said locking rod, and holes associated with said stationary handle and locking rod which align when said locking rod engages said anchor plate, said alignment of holes permitting insertion of a lock mechanism to prevent further movement of said locking rod.

5. The spare-wheel carrier of claim 4 wherein the upper extremity of said restoring spring is connected to a plate pivotally attached to said straight bean and adapted to move in a horizontal plane to accompany pivotal movement of said cradle frame, thereby minimizing diagonal distorting of said spring.

* * * * *